(12) United States Patent
Cho et al.

(10) Patent No.: US 9,103,692 B2
(45) Date of Patent: Aug. 11, 2015

(54) NAVIGATION METHOD OF MOBILE TERMINAL AND APPARATUS THEREOF

(75) Inventors: Chae-Guk Cho, Gyeonggi-Do (KR); Sung-Ha Choi, Seoul (KR); Yong-Hwan Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 442 days.

(21) Appl. No.: 12/819,757

(22) Filed: Jun. 21, 2010

(65) Prior Publication Data
US 2011/0071758 A1    Mar. 24, 2011

(30) Foreign Application Priority Data
Sep. 23, 2009    (KR) .................. 10-2009-0090237

(51) Int. Cl.
*G01C 21/00* (2006.01)
*G01C 21/36* (2006.01)

(52) U.S. Cl.
CPC ........ *G01C 21/3682* (2013.01); *G01C 21/3679* (2013.01); *G01C 21/00* (2013.01); *G01C 21/3667* (2013.01); *G01C 21/3673* (2013.01); *G01C 21/3685* (2013.01)

(58) Field of Classification Search
CPC .............................................. G08G 1/096844
USPC ................. 701/426, 428; 340/995.19–995.28
See application file for complete search history.

(56) References Cited

U.S. PATENT DOCUMENTS

| | | | | |
|---|---|---|---|---|
| 5,864,125 A * | 1/1999 | Szabo | ........................... | 235/384 |
| 6,128,571 A * | 10/2000 | Ito et al. | ....................... | 701/426 |
| 6,839,628 B1 * | 1/2005 | Tu | .................................. | 701/426 |
| 7,076,505 B2 * | 7/2006 | Campbell | ..................... | 701/438 |
| 7,155,339 B2 * | 12/2006 | Tu | .................................. | 701/426 |
| 7,406,665 B2 * | 7/2008 | Yokota | ......................... | 715/826 |
| 7,480,566 B2 * | 1/2009 | Laverty | ......................... | 701/426 |
| 7,639,163 B2 * | 12/2009 | Tran | ........................ | 340/995.19 |
| 7,890,254 B2 * | 2/2011 | Arnold-Huyser et al. | ..... | 701/426 |
| 7,991,545 B2 * | 8/2011 | De Silva et al. | .............. | 701/426 |
| 2005/0085999 A1 * | 4/2005 | Onishi | ......................... | 701/211 |
| 2006/0253247 A1 * | 11/2006 | de Silva et al. | ............... | 701/201 |
| 2008/0125966 A1 * | 5/2008 | Yamazaki | ..................... | 701/208 |
| 2009/0171584 A1 * | 7/2009 | Liu et al. | ...................... | 701/213 |
| 2009/0240431 A1 * | 9/2009 | Chau et al. | .................... | 701/208 |
| 2009/0326799 A1 * | 12/2009 | Crook | ........................... | 701/201 |
| 2010/0217521 A1 * | 8/2010 | Tysowski | ...................... | 701/208 |
| 2011/0131243 A1 * | 6/2011 | Aben et al. | .................... | 707/771 |

FOREIGN PATENT DOCUMENTS

JP    2008203351 A    *    9/2008

* cited by examiner

*Primary Examiner* — Thomas Tarcza
*Assistant Examiner* — Tyler J Lee
(74) *Attorney, Agent, or Firm* — Birch, Stewart, Kolasch & Birch, LLP

(57) ABSTRACT

A navigation method and apparatus of a mobile terminal displays only a particular point of interest (POI) existing by the roadside of a pre-set route when the POI is selected by the user, to thereby provide the user-selected POI without changing the route (or without re-searching the route). The navigation apparatus of a mobile terminal includes a display unit configured to display a route from a current location to a destination on map data, and a controller configured to search a first point of interest (POI) among the first POI located by the roadside of the route and a second POI located near the route, and display location information of the searched first POI on the display unit.

18 Claims, 13 Drawing Sheets

NAVIGATION METHOD OF MOBILE TERMINAL AND APPARATUS THEREOF

CROSS-REFERENCE TO A RELATED APPLICATION

Pursuant to 35 U.S.C. §119(a), this application claims the benefit of earlier filing date and right of priority to Korean Application No. 10-2009-0090237 filed on Sep. 23, 2009, the contents of which are incorporated by reference herein in its entirety.

BACKGROUND OF THE INVENTION

1. Field of the Invention

The present invention relates to a navigation method and apparatus of a mobile terminal.

2. Description of the Related Art

In general, a vehicle navigation apparatus generates road guide information based on a global positioning system (GPS) signal and map information and provides the generated road guide information to a user.

SUMMARY OF THE INVENTION

According to an aspect of the present invention, there is provided a navigation apparatus of a mobile terminal, including: a display unit configured to display a route from a current location to a destination on map data; and a controller configured to search a first point of interest (POI) among the first POI located by the roadside of the route and a second POI located near the route, and display location information of the searched first POI on the display unit.

According to another aspect of the present invention, there is provided a navigation method of a mobile terminal, including: displaying a route from a current location to a destination on map data; searching a first point of interest (POI) among the first POI located by the roadside of the route and a second POI located near the route; and displaying location information of the searched first POI on a display unit.

The foregoing and other objects, features, aspects and advantages of the present invention will become more apparent from the following detailed description of the present invention when taken in conjunction with the accompanying drawings.

DETAILED DESCRIPTION OF THE INVENTION

A navigation method and apparatus of a mobile terminal capable of displaying only a particular point of interest (POI) existing by the roadside of a pre-set route when the POI is selected by the user, to thereby provide the user-selected POI without changing the route (or without researching the route), according to exemplary embodiments of the present invention will now be described with reference to FIGS. 1 to 17.

Figure 1:
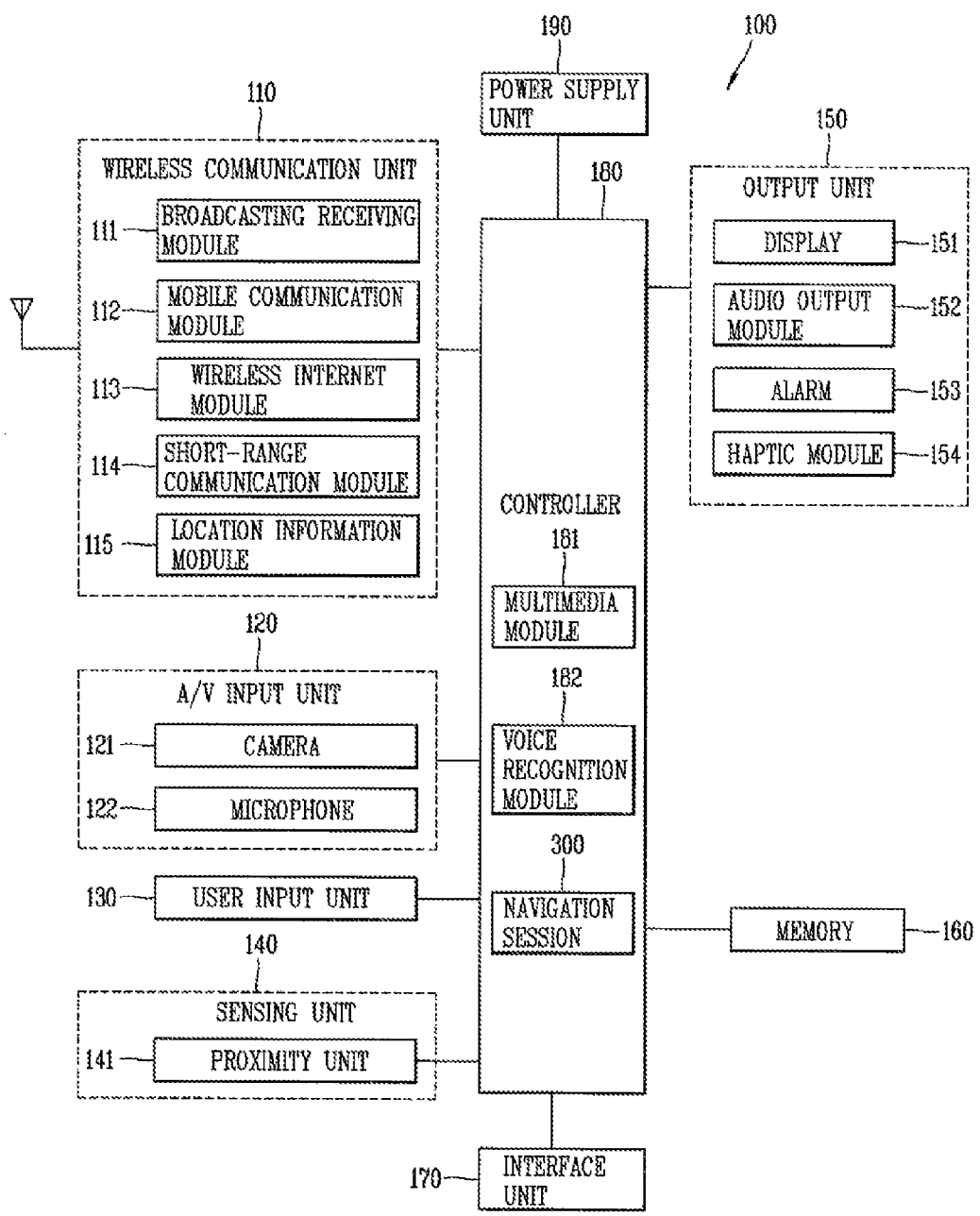
FIG. 1 is a schematic block diagram of a mobile communication terminal according to an exemplary embodiment of the present invention.

FIG. 1 is a schematic block diagram showing the configuration of a mobile communication terminal employing an image display apparatus according to an exemplary embodiment of the present invention. The mobile communication terminal 100 may be implemented in various forms such as mobile phones, smart phones, notebook computers, digital broadcast terminals, PDAs (Personal Digital Assistants), PMPs (Portable Multimedia Player), etc. All components of the mobile communication terminal 100 are operatively coupled and configured.

As shown in FIG. 1, the mobile communication terminal 100 includes a wireless communication unit 110, an NV (AudioNideo) input unit 120, a user input unit 130, a sensing unit 140, an output unit 150, a memory 160, an interface unit 170, a controller 180, and a power supply unit 190, etc. FIG. 1 shows the mobile communication terminal 100 having various components, but it is understood that implementing all of the illustrated components is not a requirement. The mobile communication terminal 100 may be implemented by greater or fewer components.

The wireless communication unit 110 typically includes one or more components allowing radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the terminal. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal (when the mobile communication terminal is located in a vehicle, the location of the vehicle can be checked). For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile communication terminal 100 such as an opened or closed state of the mobile communication terminal 100, a location of the mobile communication terminal 100, the presence or absence of user contact with the mobile communication terminal 100 (i.e., touch inputs), the orientation of the mobile communication terminal 100, an acceleration or deceleration movement and direction of the mobile communication terminal 100, etc., and generates commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating user's authority for using the mobile communication terminal 100 and may include a user identity module (UIM), a subscriber identity module (SIM) a universal subscriber identity module (USIM), and the like.

In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile communication terminal 100 or may be used to transfer data between the mobile communication terminal and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units (or other display means) according to its particular desired embodiment. For example, the mobile terminal may include both an external display unit (not shown) and an internal display unit (not shown).

Meanwhile, when the display unit 151 and the touch pad are overlaid in a layered manner to form a touch screen, the display unit 151 may function as both an input device and an output device. The touch sensor may have the form of, for example, a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input position and a touch input area. When there is a touch input with respect to the touch sensor, the corresponding signal(s) are sent to a touch controller (not shown). The touch controller processes the signal(s) and transmits corresponding data to the controller 180. Accordingly, the controller 180 can recognize a touched region of the display unit 151.

A proximity sensor 141 of the mobile communication terminal 100 will now be described with reference to FIG. 2.

Figure 2:
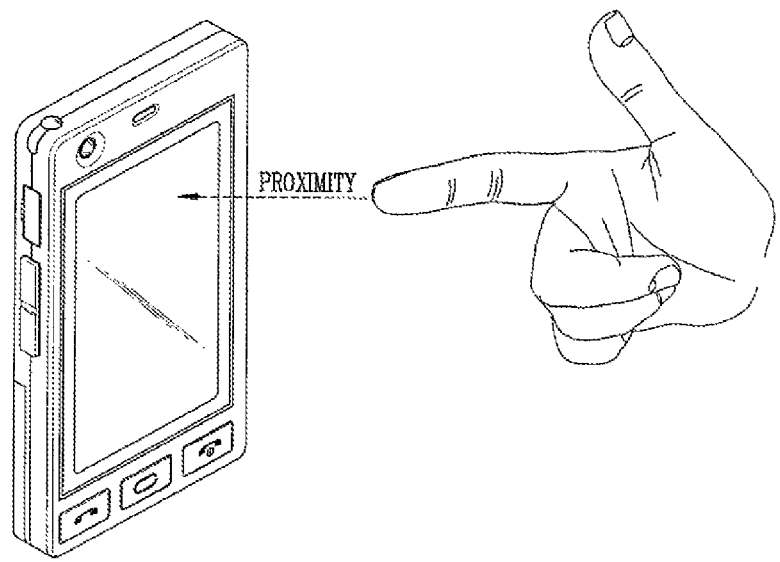
FIG. 2 illustrates a proximity touch of the mobile communication terminal according to an exemplary embodiment of the present invention.

FIG. 2 illustrates a proximity touch for explaining a data display method according to an exemplary embodiment of the present invention.

Proximity touch refers to recognition of the pointer positioned to be close to the touch screen without being in contact with the touch screen.

The proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, a touch input etc. In addition to video or audio signals, the alarm unit 153 may output signals in a different manner, for example, to inform about an occurrence of an event. The video or audio signals may be also outputted via the audio output module 152, so the display unit 151 and the audio output module 152 may be classified as parts of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

The voice recognition module 182 recognizes a voice pronounced by the user and performs a corresponding function according to the recognized voice signal.

A navigation session 300 applied to the mobile terminal 100 displays a travel route on map data.

Figure 3:
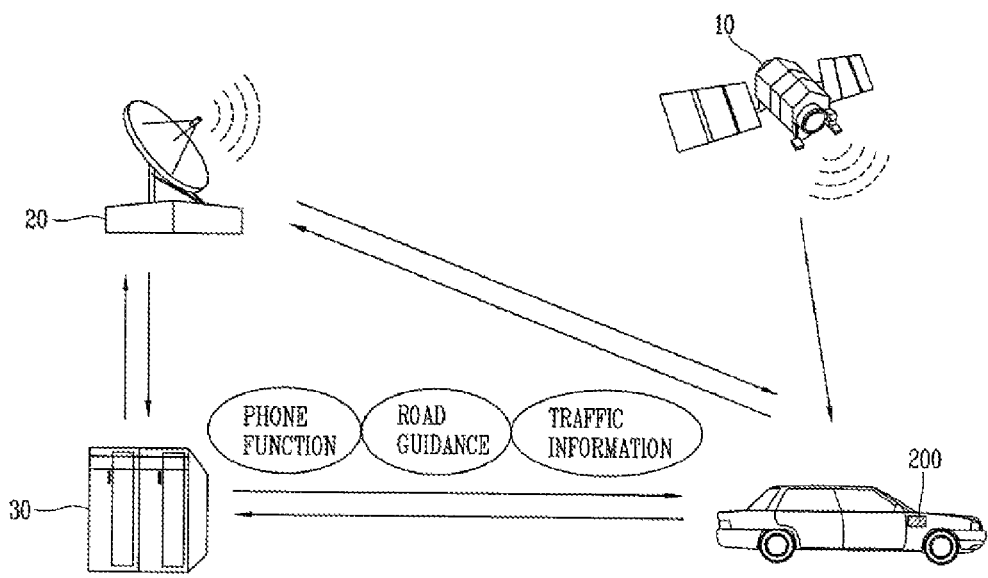
FIG. 3 is a schematic block diagram of a vehicle navigation system according to an exemplary embodiment of the present invention.

FIG. 3 is a schematic block diagram showing a vehicle navigation system according to an exemplary embodiment of the present invention.

As shown in FIG. 3, the vehicle navigation system includes an information providing center 30 for providing traffic information and various data (e.g., programs, execution files, etc.); and a telematics terminal 200 that is mounted within a vehicle, receives traffic information via a remote wireless communication network 20 and/or short-range wireless communication network, and provides a road guidance service based on a GPS signal received via an artificial satellite 10 and the traffic information.

The configuration of the telematics terminal 200 according to an exemplary embodiment of the present invention will now be described with reference to FIG. 4.

Figure 4:
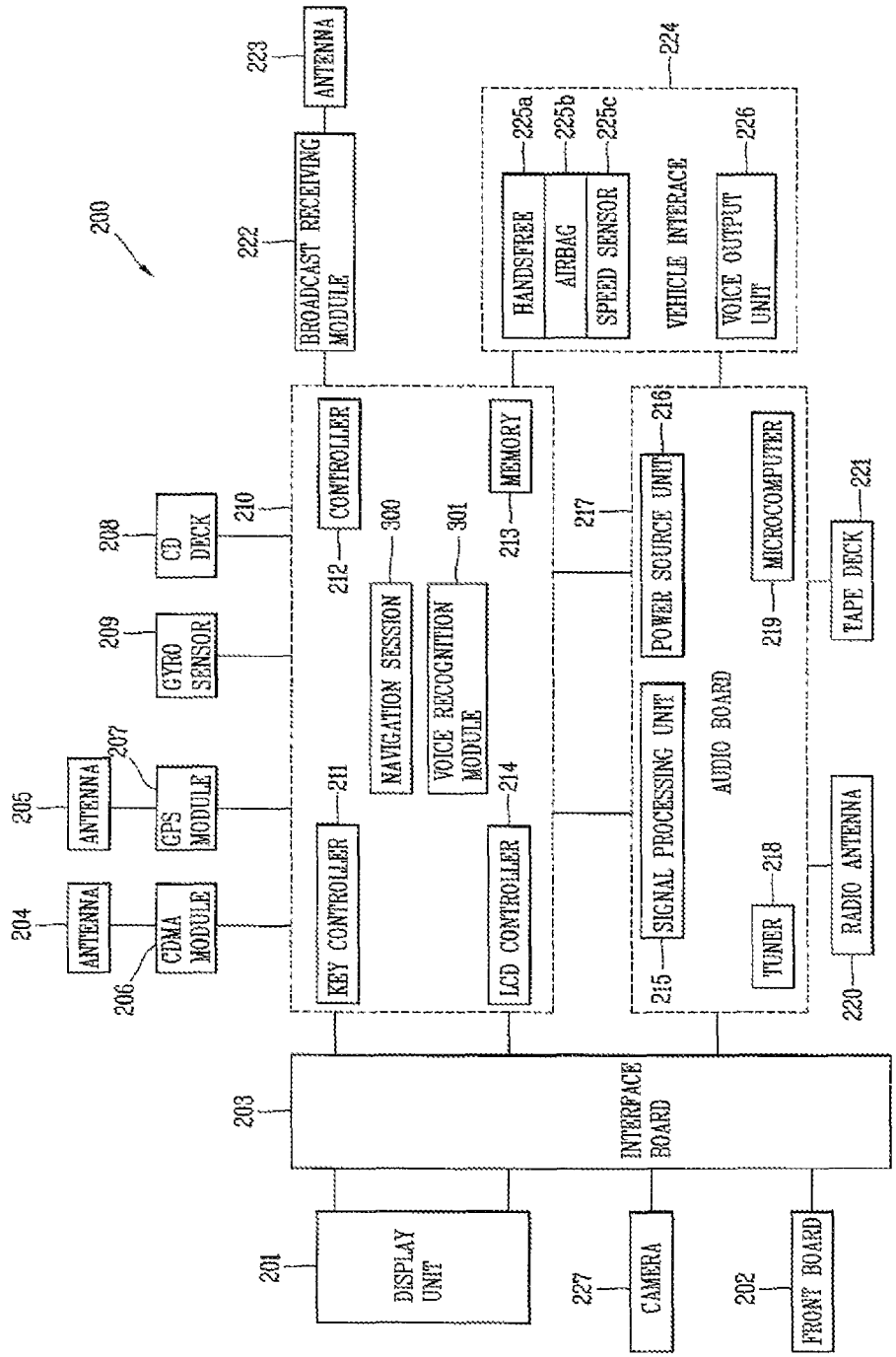
FIG. 4 is a schematic block diagram showing a telematics terminal according to an exemplary embodiment of the present invention.

FIG. 4 is a schematic block diagram showing a telematics terminal employing the vehicle navigation apparatus according to the present invention.

As shown in FIG. 4, the telematics terminal 200 includes a main board 210 including a controller (such as a Central Processing Unit) 212 for controlling the telematics terminal 200 overall, a memory 213 for storing various information, a key controller 211 for controlling various key signals, and an LCD controller 214 for controlling an LCD.

The memory 213 stores map information (map data) for displaying road guidance information on a digital map. Also, the memory 213 stores a traffic information collecting control algorithm for inputting traffic information according to the situation of a road along which the vehicle currently travels (runs), and information for controlling the algorithm.

The main board 210 includes a CDMA module 206, a mobile terminal having a unique device number as assigned and installed in the vehicle, a GPS module 207 for guiding a location of the vehicle, receiving a GPS signal for tracking a travel route from a start point to a destination, or transmitting traffic information collected by the user as a GPS signal, a CD deck 208 for reproducing a signal recorded in a CD (Compact Disk), a gyro sensor 209, or the like. The CDMA module 206 and the GPS module 207 receive signals via antennas 204 and 205.

A broadcast receiving module 222 is connected with the main board 210 and receives a TV signal via a TV antenna 223. A display unit (i.e., an LCD) 201 under the control of the LCD controller 214, a front board 202 under the control of the key controller 211, and a camera 227 for capturing the interior and/or the exterior of a vehicle are connected to the main board 210 via an interface board 203. The display unit 201 displays various video signals and character signals, and the front board 202 includes buttons for various key signal inputs and provides a key signal corresponding to a button selected by the user to the main board 210. Also, the display unit 201 includes a proximity sensor and a touch sensor (touch screen) of FIG. 2.

The front board 202 includes a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219 and a signal processing unit 215 for processing various voice signals.

The audio board 217 also includes a radio antenna 220 for receiving a radio signal and a tape deck 221 for playing an audio tape. The audio board 217 may further include a voice output unit (e.g., an amplifier) 226 for outputting a voice signal processed by the audio board 217.

The voice output unit (amplifier) 226 is connected to a vehicle interface 224. Namely, the audio board 217 and the main board 210 are connected to the vehicle interface 224. A handsfree 225a for inputting a voice signal, an airbag 225b configured for the security of a passenger, a speed sensor 225c for detecting the speed of the vehicle, or the like, may be connected to the vehicle interface 224. The speed sensor 225c calculates a vehicle speed and provides the calculated vehicle speed information to the controller 212.

The navigation session 300 applied to the telematics terminal 200 generates road guidance information based on the map data and current location information of the vehicle and provides the generated road guidance information to a user.

The display unit 201 detects a proximity touch within a display window via a proximity sensor. For example, when a pointer (e.g., user's finger or stylus) is proximity-touched, the display unit 201 detects the position of the proximity touch and outputs position information corresponding to the detected position to the controller 212.

A voice recognition device (or a voice recognition module) 301 recognizes a voice pronounced by the user and performs a corresponding function according to the recognized voice signal.

The navigation session 300 applied to the telematics terminal displays a travel route on map data, and when the mobile terminal 100 is located within a pre-set distance from a blind spot included in the travel route, the navigation session 300 automatically forms a wireless network together with a terminal (e.g., a vehicle navigation apparatus) mounted in a nearby vehicle or a mobile communication terminal carried around by a nearby pedestrian via radio communication (e.g., a short-range wireless communication network) to receive location information of a nearby vehicle from the terminal mounted in the nearby vehicle and receive location information of the nearby pedestrian from the mobile communication terminal carried around by the nearby pedestrian.

Figure 5:
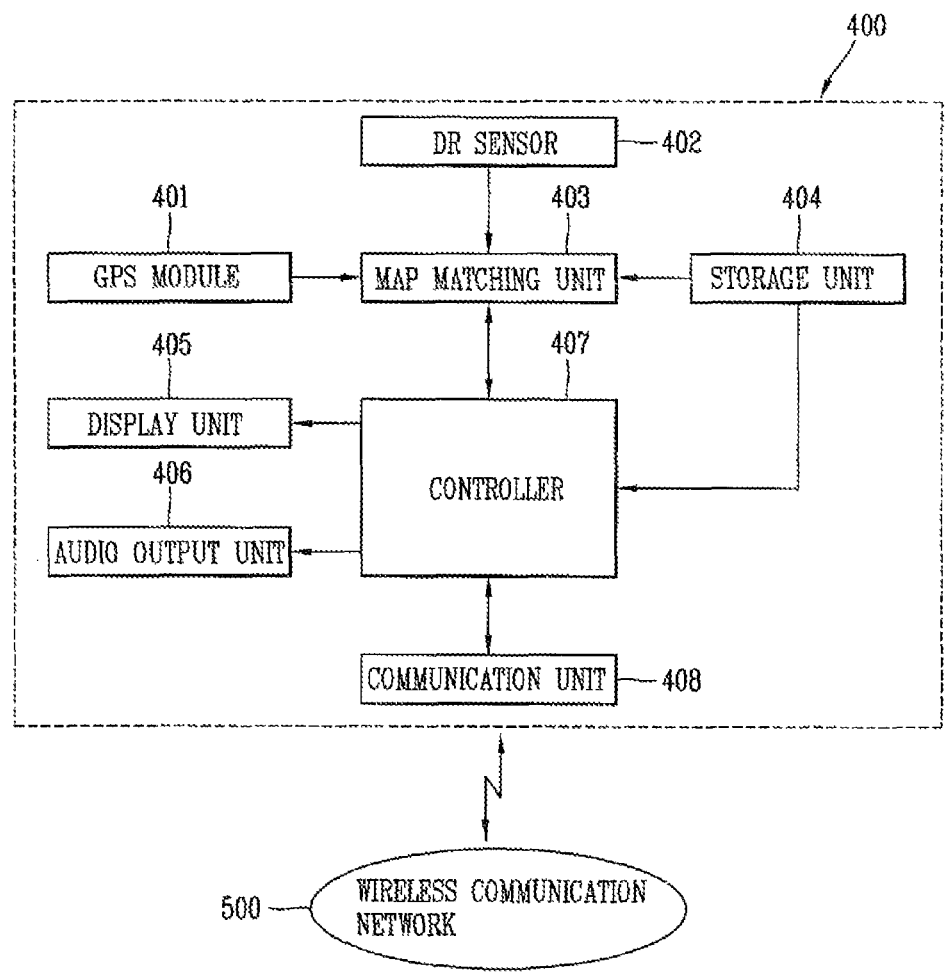
FIG. 5 is a schematic block diagram of a navigation apparatus (vehicle navigation) of a mobile terminal according to a first exemplary embodiment of the present invention.

FIG. 5 is a schematic block diagram showing the configuration of the navigation apparatus 400 (vehicle navigation) according to the first exemplary embodiment of the present invention.

As shown in FIG. 5, the navigation apparatus 400 includes a GPS module 401 for receiving a GPS signal from a satellite and generating first vehicle location data of the navigation apparatus (regarded as the same location as the telematics terminal 200 or the mobile communication terminal 100) based on the received GPS signal; a DR (Dead-Reckoning) sensor 402 for generating second vehicle location data based on a travel direction and the speed of a vehicle; a storage unit (or a memory) 404 for storing map data and various information; a map matching unit 403 for generating an estimated vehicle location based on the first and second vehicle location data, matching the generated estimated vehicle location and a link (map matching link or a map matching road) in the map data stored in the storage unit 404, and outputting the matched map information (map matching results); a communication unit 408 for receiving real time traffic information from an information providing center and/or a nearby vehicle via a wireless communication network 500, and performing call communication; a controller 407 for generating road guidance information based on the matched map information (map matching results); a display unit 405 for displaying a road guidance map (including information about a point of interest (POI)) included in the road guidance information; and a voice output unit 406 for outputting road guidance voice information (road guidance voice message) included in the road guidance information.

Here, the communication unit 408 may include a handsfree having a Bluetooth module.

The road guidance information may include various information related to traveling such as lane information, speed limit information, turn-by-turn information, traffic safety information, traffic guidance information, vehicle information, road search information, as well as the map data.

The signal received via the GPS module 401 may be configured to provide the location information of the terminal to the navigation apparatus 400 by using a wireless communication scheme such as 802.11, a standard of the wireless network for WLAN including wireless LAN, some infrared communication, and the like, 802.15, a standard for a wireless personal area network (PAN) including Bluetooth™, UWB, ZigBee, and the like, 802.16, a standard for a wireless metropolitan area network (MAN) broadband wireless access (BWA) including a fixed wireless access (FWA), and the like, and 802.20, a standard for the mobile Internet with respect to a mobile broadband wireless access (MBWA) including WiBro, WiMAX, and the like, proposed by IEEE (Institute of Electrical and Electronics Engineers).

The navigation apparatus 400 may further include an input unit. The input unit may select a user-desired function or receive information, and various devices such as a keypad, a touch screen, a jog shuttle, a microphone, and the like, may be used as the input unit.

The map matching unit 403 generates an estimated vehicle location based on the first and second vehicle location data, and reads map data corresponding to a travel route from the storage unit 404.

The map matching unit 403 matches the estimated vehicle location and a link (road) included in the map data, and outputs the matched map information (map matching results) to the controller 407. For example, the map matching unit 403 generates the estimated vehicle location based on the first and second location data, matches the generated estimated vehicle location and links in the map data stored in the storage unit 404 according to the link order, and outputs the matched map information (map matching results) to the controller 407. The map matching unit 403 may output information regarding road attributes such as single lane road, double lane road, and the like, included in the matched map information (map matching results). The function of the map matching unit 403 may be implemented in the controller 407.

The storage unit 404 stores map data. In this case, the stored map data includes geographic coordinates (or longitude/latitude coordinates) representing the latitude and longitude by DMS (Degree/Minute/Second) unit. Here, besides the geographic coordinates, universal transverse mercator (UTM) coordinates, universal polar system (UPS) coordinates, transverse mercator (TM) coordinates, and the like, may be also used as the stored map data.

The storage unit 404 stores various information such as various menu screen images, a point of interest (POI), function characteristics information according to a particular position of map data, and the like. The storage unit 404 stores various user interfaces (UIs) and/or graphic UIs (GUIs). The storage unit 404 stores data and programs required for operating the navigation apparatus 400. The storage unit 404 stores destination information inputted from the user via the input unit. In this case, the destination information may be a destination or one of a destination and a start point.

The display unit 405 displays image information (or road guidance map) included in the road guidance information generated by the controller 407. Here, the display unit 405 includes a touch sensor (touch screen) and/or a proximity sensor. The road guidance information may include various information in relation to traveling (running, driving) such as lane information, speed limit information, turn-by-turn information, traffic safety information, traffic guidance information, vehicle information, road search information, and the like, as well as the map data.

When displaying the image information, the display unit 405 may display various contents such as various menu screen images, road guidance information, and the like, by using a user interface and/or a graphic user interface included in the storage unit 404. Here, the contents displayed on the display unit 405 may include various text or image data (including map data or various information data), and a menu screen image including data such as icons, list menus, combo boxes, and the like.

The voice output unit 406 outputs voice information included in road guidance information (or a voice message with respect to the road guidance information) generated by the controller 407. Here, the voice output unit 406 may be an amplifier or a speaker.

The controller 407 generates the road guidance information based on the matched map information and outputs the generated road guidance information to the display unit 405 and the voice output unit 406. Then, the display unit 405 displays the road guidance information.

The controller 407 receives real time traffic information from the information providing center and/or a terminal (vehicle navigation apparatus) mounted in a nearby vehicle and generates road guidance information.

The controller 407 may be connected to a call center via the communication unit 408 to perform call communication, or transmit or receive information between the navigation apparatus 400 and the call center. Here, the communication unit 408 may include a handsfree module having a Bluetooth™ function using a short-range radio communication scheme.

When a POI search menu is selected by the user, the controller 407 searches a POI located in a route from the current location to a destination, and displays the searched POI on the display unit 405. In this case, the controller 407 searches a POI (namely, a point at which the route does not need to be changed (re-searched), e.g., a POI positioned at left or right side of the traveling road) positioned on the route and/or a POI (namely, a point at which the route needs to be changed, e.g., a point at which the pre-set route needs to be changed in order to go through a nearby POI positioned near the route, and displays the searched POI on the display unit 405.

Hereinafter, a navigation apparatus and method of a mobile terminal according to a first exemplary embodiment of the present invention will be described with reference to FIGS. 5 to 9. Here, the navigation apparatus and method according to the first exemplary embodiment of the present invention may be applicable to various terminals such as a smart phone, a notebook computer, a personal digital assistant (PDA), a portable multimedia player (PMP) as well as to the mobile communication terminal 100, the telematics terminal 200, and the navigation apparatus 400.

Figure 6:
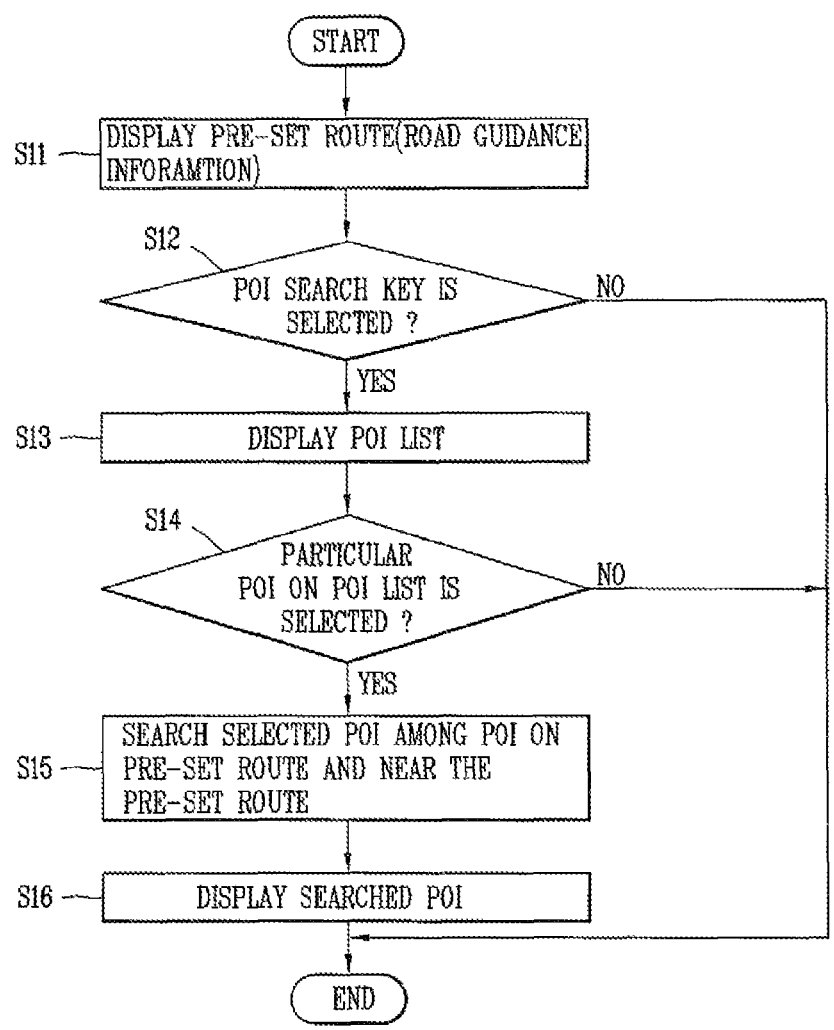
FIG. 6 is a flow chart illustrating the process of a navigation method of a mobile terminal according to the first exemplary embodiment of the present invention.

FIG. 6 is a flow chart illustrating the process of a navigation method of a mobile terminal according to the first exemplary embodiment of the present invention.

First, when a route (road guidance information) from a current location to a destination is set, the controller 407 displays the set route on the display unit 405 (S11).

The controller 407 determines whether or not a POI search key, among various keys (e.g., a destination key, a menu key, a road guidance key, a POI search key) displayed together with the route, is selected by the user (S12).

Figure 7:
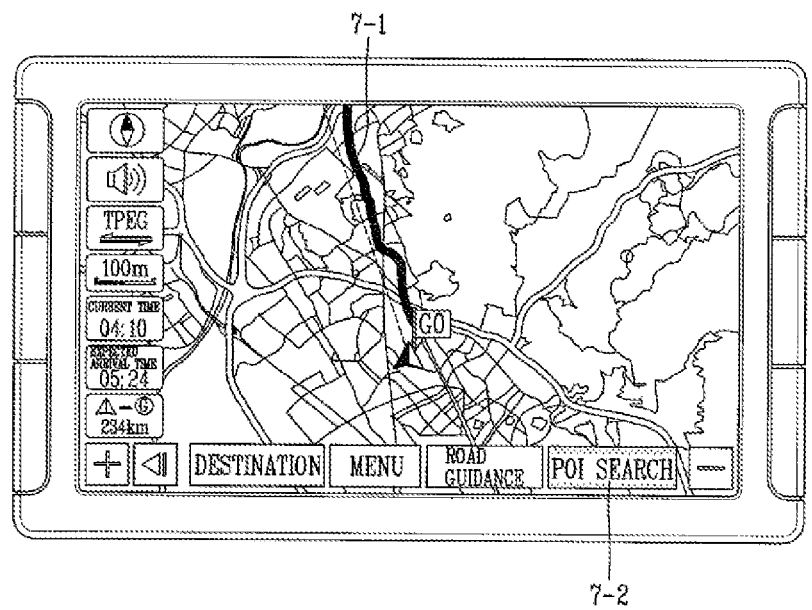
FIG. 7 illustrates a POI search key according to the first exemplary embodiment of the present invention.

FIG. 7 illustrates a POI search key according to the first exemplary embodiment of the present invention.

As shown in FIG. 7, the controller 407 determines whether or not a POI search key 7-2, among a destination key, a menu key, a road guidance key, and the POI search key 7-2 displayed together with a route 7-1, is selected by the user. Here, the controller 407 displays a travel route 7-1 from a current location of a vehicle to a destination on a map (digital map).

When the POI search key 7-2 is selected by the user, the controller 407 displays a POI list on the display unit 405 (S13).

Figure 8:
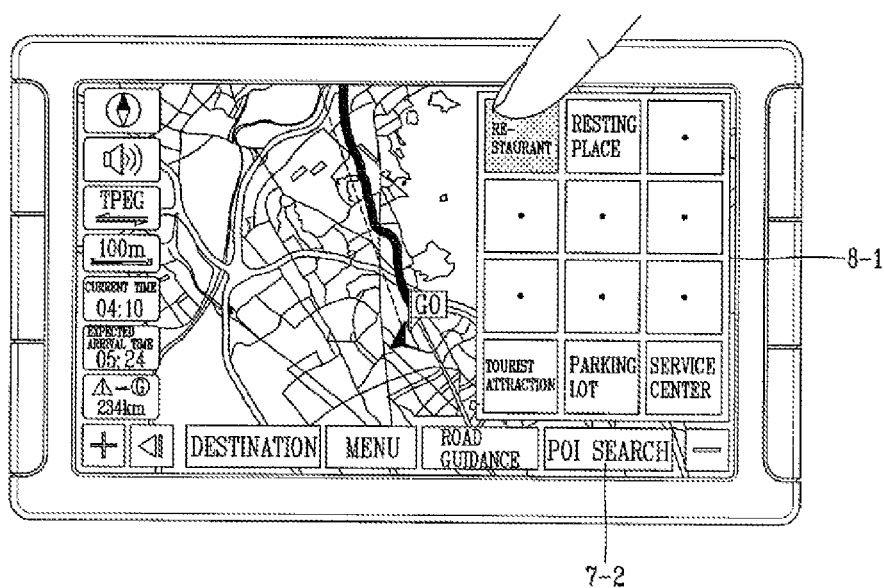
FIG. 8 illustrates a POI list according to the first exemplary embodiment of the present invention.

FIG. 8 illustrates a POI list according to the first exemplary embodiment of the present invention.

As shown in FIG. 8, when the POI search key 7-2 is selected by the user, the controller 407 displays a POI list 8-1 on the display unit 405. For example, the controller 407 displays the POI list 8-1 including various POIs (POI information) such as a restaurant, a resting place, a tourist attraction, a parking lot, a service center, a gas station, and the like, on the display unit 405.

The controller 407 determines whether or not a particular POI (e.g., a restaurant) is selected from the POI list 8-1 (S14). For example, the controller 407 determines whether the user has selected one of the restaurant, the gas station, the resting plate, the tourist attraction, the parking lot, and the service center.

When a particular POI (e.g., the restaurant) is selected from the POI list 8-1, the controller 407 searches the selected POI from the POIs on the route and POIs near the route (S15) and displays the searched POI on the display unit 405 (S16).

Figure 9:
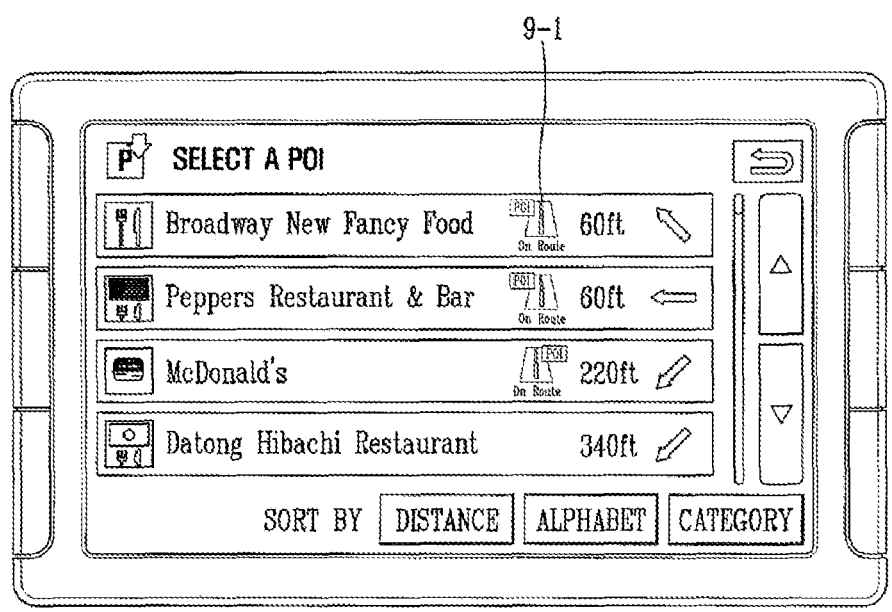
FIG. 9 illustrates a searched particular POI according to the first exemplary embodiment of the present invention.

FIG. 9 illustrates a searched particular POI according to the first exemplary embodiment of the present invention.

As shown in FIG. 9, when the 'restaurant' is selected from the POI list 8-1, the controller 407 searches the selected 'restaurant' from the POIs on the route and POIs near the route, and displays the searched POI on the display unit 405. In this case, when the 'restaurant' is a POI (POI whose route does not need to be changed) positioned at the left or right side of the route, the controller displays information (e.g., an icon) 9-1 indicating that the 'restaurant' is located at the left or right side of the route as well as the distance to the 'restaurant' from the current location. Here, the searched POI may be classified in the order of distance, alphabet, and category. The information (e.g., the icon) 9-1 indicating that the POI is located at the left or right side of the route is previously stored in the storage unit 404. Here, the icon (e.g., 'On Route' key) indicates that the particular POI is located at the right roadside of the route or the left roadside of the route. Thus, because the information (e.g., the icon) 9-1 indicating that the POI selected by the user is located at the right or left side of the route is displayed on the display unit 405, the user can intuitively determine whether or not the POI is located on the route or whether or not the POI is located near the route upon viewing the POI displayed on the display unit 405.

Hereinafter, a navigation apparatus and method of a mobile terminal according to a second exemplary embodiment of the present invention will now be described with reference to FIGS. 5, 10, and 11. Here, the navigation apparatus and method according to the second exemplary embodiment of the present invention may be applicable to various terminals such as a smart phone, a notebook computer, a personal digital assistant (PDA), a portable multimedia player (PMP) as well as to the mobile communication terminal 100, the telematics terminal 200, and the navigation apparatus 400.

Figure 10:
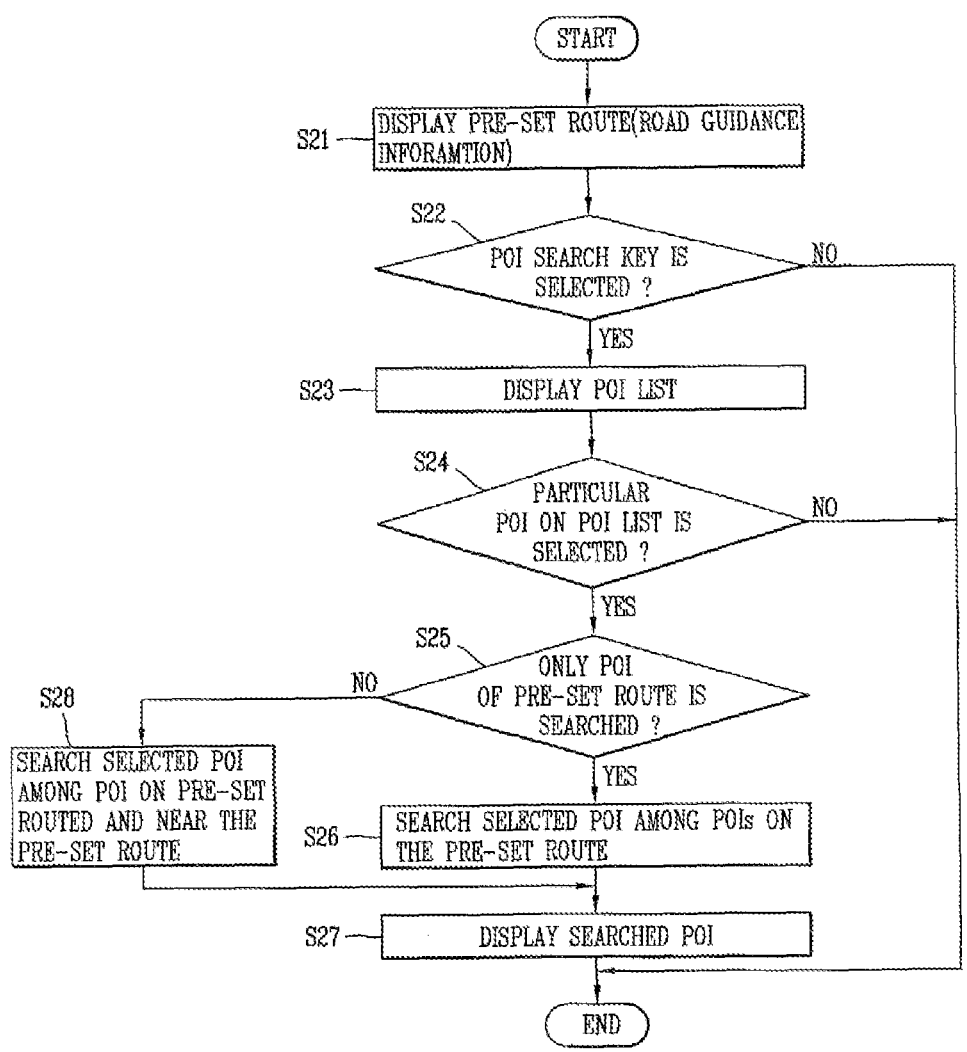
FIG. 10 is a flow chart illustrating the process of a navigation method of a mobile terminal according to a second exemplary embodiment of the present invention.

FIG. 10 is a flow chart illustrating the process of a navigation method of a mobile terminal according to a second exemplary embodiment of the present invention.

First, when a route (road guidance information) from a current location to a destination is set, the controller 407 displays the pre-set route on the display unit 405 (S21).

The controller 407 determines whether or not a POI search key, among various keys (e.g., a destination key, a menu key, a road guidance key, a POI search key) displayed together with the route, is selected by the user (S22). For example, the controller 407 determines whether or not a POI search key 7-2, among a destination key, a menu key, a road guidance key, and the POI search key 7-2 displayed together with a route 7-1, is selected by the user. Here, the controller 407 displays a travel route 7-1 from a current location of a vehicle to a destination on a map (digital map).

When the POI search key 7-2 is selected by the user, the controller 407 displays a POI list 8-1 on the display unit 405 (S23). For example, the controller 407 displays the POI list 8-1 including various POIs (POI information) such as a restaurant, a resting place, a tourist attraction, a parking lot, a service center, a gas station, and the like, on the display unit 405.

The controller 407 determines whether or not a particular POI (e.g., a restaurant) is selected from the POI list 8-1 (S24). For example, the controller 407 determines whether the user has selected one of the restaurant, the gas station, the resting plate, the tourist attraction, the parking lot, and the service center.

When a particular POI (e.g., the restaurant) is selected from the POI list 8-1, the controller 407 generates a pop-up window inquiring about whether to search only POIs existing by the roadside of the pre-set route and displays the generated pop-up window on the display unit 405 (S25).

When an OK key of the pop-up window inquiring about whether to search only POIs existing by the roadside of the pre-set route is selected, the controller 407 searches the particular POI among the POIs existing by the roadside of the pre-set route (S26).

Figure 11:
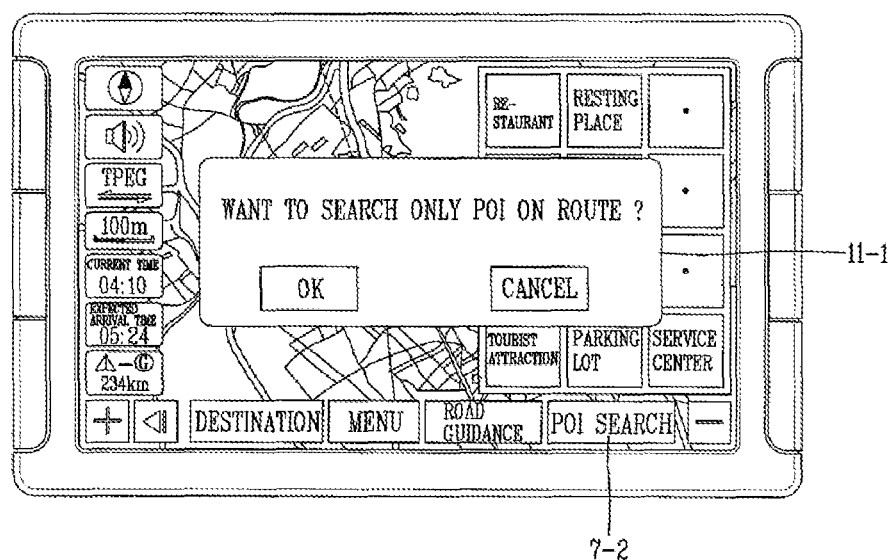
FIG. 11 illustrates a pop-up window inquiring about whether to search only a POI existing by the roadside of a pre-set route according to the second exemplary embodiment of the present invention.

FIG. 11 illustrates a pop-up window inquiring about whether to search only a POI existing by the roadside of a pre-set route according to the second exemplary embodiment of the present invention.

As shown in FIG. 11, the controller 407 display a pop-up window 11-1 inquiring about whether to search only POIs existing by the roadside of the set route on the display unit 405, and when an OK key of the pop-up window 11-1 is selected by the user, the controller 407 searches the particular POI among the POIs existing by the roadside of the pre-set route and displays the searched POI on the display unit 405 (S27).

Meanwhile, when a cancel key of the pop-up window 11-1 is selected by the user, the controller 407 searches POIs existing by the roadside of the pre-set route and POIs near the pre-set route (S28) and displays the searched POIs on the display unit 405.

In this manner, when a particular POI is selected by the user, only the particular POI existing by the roadside of the pre-set route is displayed on the display unit 405. Thus, the user can quickly and easily check the POI existing by the roadside of the pre-set route without having to change the route (without having to re-search the route).

Hereinafter, a navigation apparatus and method of a mobile terminal according to a third exemplary embodiment of the present invention will now be described with reference to FIGS. 5, 12 to 17. Here, the navigation apparatus and method according to the third exemplary embodiment of the present invention may be applicable to various terminals such as a smart phone, a notebook computer, a personal digital assistant (PDA), a portable multimedia player (PMP) as well as to the mobile communication terminal 100, the telematics terminal 200, and the navigation apparatus 400.

Figure 12:
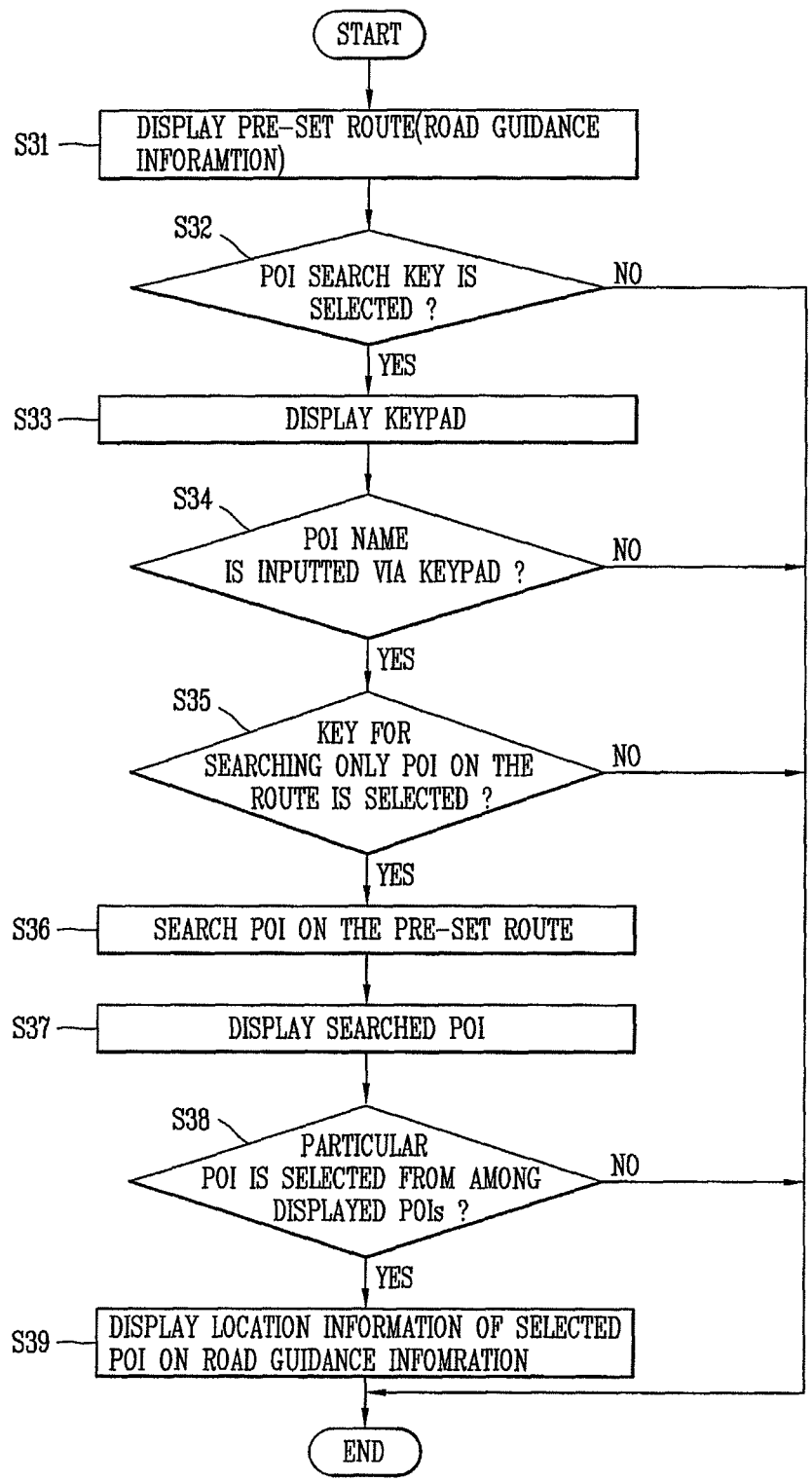
FIG. 12 is a flow chart illustrating the process of a navigation method of a mobile terminal according to a third exemplary embodiment of the present invention.

FIG. 12 is a flow chart illustrating the process of a navigation method of a mobile terminal according to a third exemplary embodiment of the present invention.

First, when a route (road guidance information) from a current location to a destination is set, the controller 407 displays the pre-set route on the display unit 405 (S31).

The controller 407 determines whether or not a POI search key, among various keys (e.g., a destination key, a menu key, a road guidance key, a POI search key) displayed together with the route, is selected by the user (S32). For example, the controller 407 determines whether or not a POI search key 7-2, among a destination key, a menu key, a road guidance key, and the POI search key 7-2 displayed together with a route 7-1, is selected by the user. Here, the controller 407 displays a travel route 7-1 from a current location of a vehicle to a destination on a map (digital map).

When the POI search key 7-2 is selected by the user, the controller 407 displays a keypad for inputting a POI name on the display unit 405 (S33).

Figure 13:
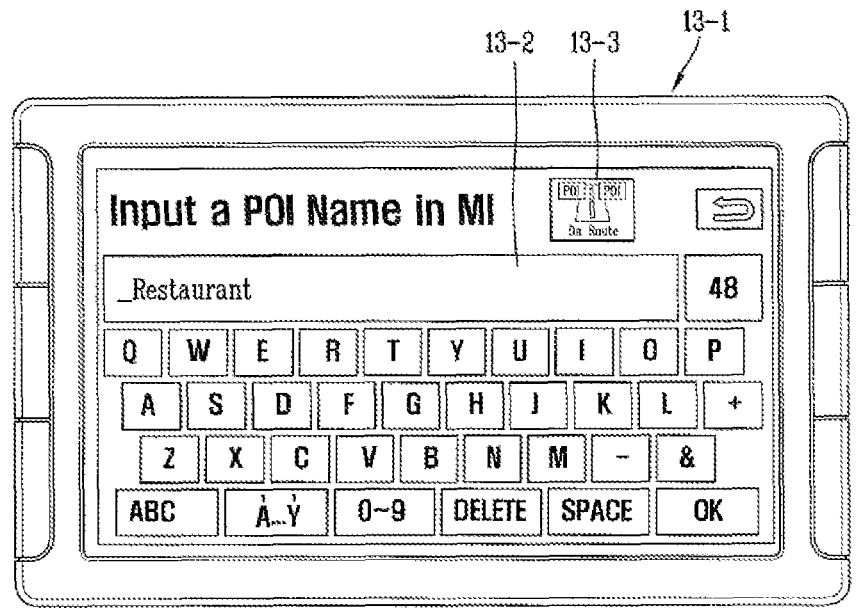
FIG. 13 illustrates a keypad according to the third exemplary embodiment of the present invention.

FIG. 13 illustrates a keypad according to the third exemplary embodiment of the present invention.

As shown in FIG. 13, when the POI search key 7-2 is selected by the user, the controller 407 displays a keypad 13-1 for inputting a POI name 13-2 on the display unit 405 (S33). Here, the controller 407 may display an icon 13-3 indicating that a particular POI selected or inputted by the user is located at the right roadside of the route or at the left roadside of the route on the keypad. To increase the ease in entering the POI name, the keypad disables keys that cannot be part of any POI name from the list of possible POI names. For instance, once the first letter "R" is input by the user, the controller 407 recognizes that the only possible POI names are "Restaurant" and "Restroom" and any key for a letter not appearing in either word would be disabled. This prevents the user accidentally entering an incorrect letter. The disabling of the letter can be indicated by such a manner as depicting the keys as gray, so that the grayed-out keys (not selectable keys) are display with the selectable keys.

The controller 407 determines whether or not a POI name is inputted via the keypad (S34). When a POI name is inputted via the keypad, the controller 407 determines whether or not an icon (or a key) 13-3 indicating location information of the POI existing by the roadside of the route is selected by the user (S35).

When the icon 13-3 is selected by the user, the controller 407 searches a POI inputted by the user among POIs existing by the roadside of the pre-set route (S36).

The controller 407 displays the searched POI on the display unit 405.

The searched POI will now be described with reference to FIG. 14.

Figure 14:
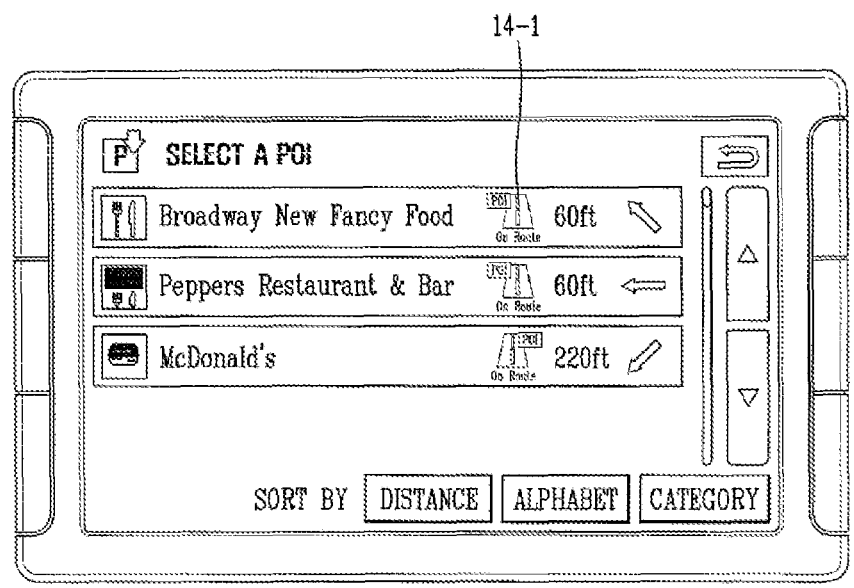
FIG. 14 illustrates a searched POI according to the third exemplary embodiment of the present invention.

FIG. 14 illustrates a searched POI according to the third exemplary embodiment of the present invention.

As shown in FIG. 14, when the icon 13-3 is selected by the user, the controller 407 searches the POI inputted by the user among the POIs existing by the roadside of the pre-set route, and displays the searched POI on the display unit 405. In this case, the controller 407 displays an icon 14-1 indicating that the POI inputted by the user is located at the left roadside or right roadside of the pre-set route on the display unit 405.

The controller 407 determines whether or not a particular POI is selected by the user form among the displayed POIs (S38).

When a particular POI is selected from among the displayed POIs by the user, the controller 407 displays road guidance information (map data) indicating the route on the display unit 405 and displays location information of the particular POI on the road guidance information (S39).

Figure 15:
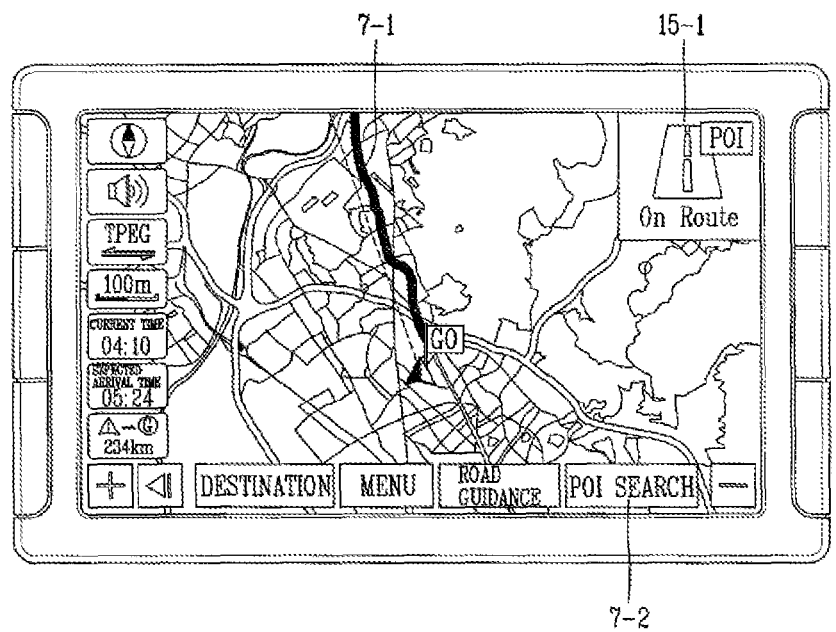
FIG. 15 illustrates one location information of a particular POI displayed on road guidance information according to the third exemplary embodiment of the present invention.

FIG. 15 illustrates location information of a particular POI displayed on road guidance information according to the third exemplary embodiment of the present invention.

As shown in FIG. 15, when a particular POI is selected from among the displayed POIs by the user, the controller 407 displays road guidance information (map data) indicating the route on the display unit 405, and when the particular POI is located at the right roadside of the pre-set route, the controller 407 displays an icon 15-1 indicating that the particular POI is located at the right roadside of the pre-set route on the road guidance information.

Figure 16:
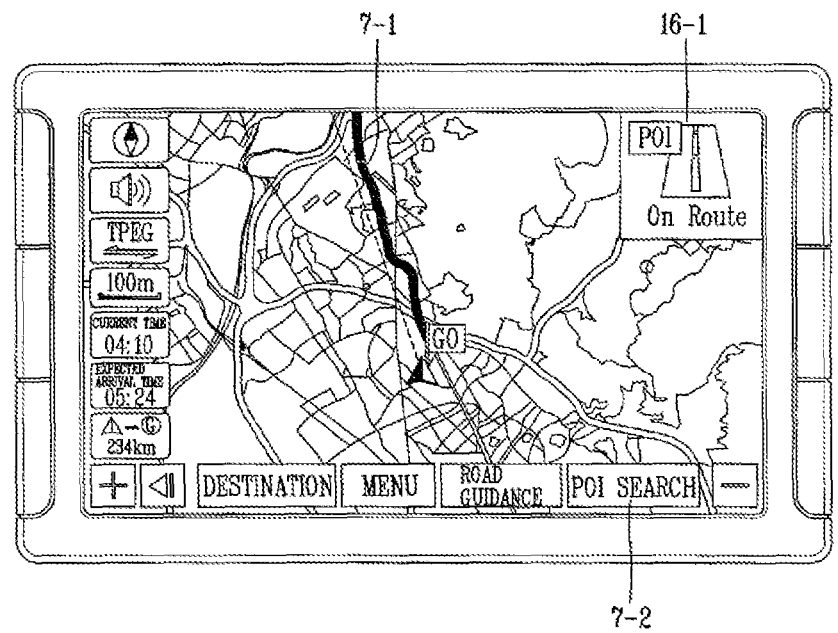
FIG. 16 illustrates another location information of a particular POI displayed on road guidance information according to the third exemplary embodiment of the present invention.

FIG. 16 illustrates another location information of a particular POI displayed on road guidance information according to the third exemplary embodiment of the present invention.

As shown in FIG. 16, when a particular POI is selected from among the displayed POIs by the user, the controller 407 displays road guidance information (map data) indicating the route on the display unit 405, and when the particular POI is located at the left roadside of the pre-set route, the controller 407 displays an icon 16-1 indicating that the particular POI is located at the left roadside of the pre-set route on the road guidance information.

Meanwhile, when the icon 16-1 displayed on the road guidance information is selected by the user, the controller 407 may display detailed information of the particular POI.

Figure 17:
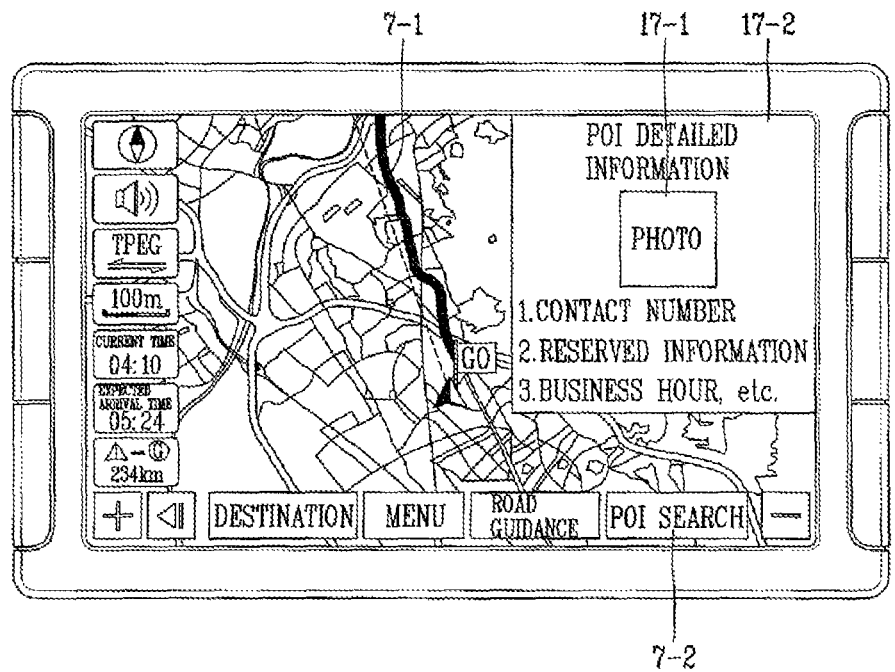
FIG. 17 illustrates detailed information of a particular POI displayed on road guidance information according to the third exemplary embodiment of the present invention.

FIG. 17 illustrates detailed information of a particular POI displayed on road guidance information according to the third exemplary embodiment of the present invention.

As shown in FIG. 17, when the icon 16-1 displayed on the road guidance information is selected by the user, the controller 407 may display detailed information 17-2 including a photo 17-1, a contact number, reservation information, business hours, and the like, of the particular POI.

In this manner, when the particular POI is inputted by the user, only the particular POI existing by the roadside of the pre-set route is displayed on the display unit 405, so the user can quickly and easily check the POI existing by the roadside of the pre-set route without having to change the route (or without having to re-search the route).

As so far described, the navigation method and apparatus of a mobile terminal according to the exemplary embodiments of the present invention have the following advantages.

When a particular POI is selected by the user, only the POI existing by the roadside of the pre-set route is displayed, thus providing the POI selected by the user without having to change the route from the current location to the destination (without having to re-search the route).

Also, when a particular POI is selected by the user, only location information of the POI existing by the roadside of the pre-set route is displayed, so that the user can intuitively check the location of the POI selected by him.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A navigation apparatus comprising:
   a display unit configured to display, on map data, a route from a current location to a destination; and
   a controller configured to:
   display a point of interest (POI) list associated with the route;
   when one POI is selected from the displayed POI list, display a window inquiring about whether to search only a POI associated with the selected one POI existing by a roadside of the route;
   when a first key of the window is selected, search, from the POI list associated with the route, only the POI associated with the selected one POI;
   when a second key of the window is selected, search, from the POI list associated with the route, the POI associated with the selected one POI and POIs near the route; and
   cooperate with the display unit to display roadside information associated with the searched POI, wherein the roadside information indicates whether a location of the searched POI is close to a left roadside of the route or a right roadside of the route, and is displayed on a left or a right side of a roadside icon, wherein the searched POI indicates a point where the route is not changed, wherein the controller is further configured to:
display a virtual keypad having a plurality of keys on the display unit;
receive a POI name through the displayed virtual keypad;
display the received POI name on a first region of the virtual keypad;
search the received POI name from the POI list; and
display, on a second region of the virtual keypad, an icon indicating whether a location of the searched POI name is close to the left roadside of the route or the right roadside of the route while the searched POI name is displayed on the first region of the virtual keypad, and wherein the controller is configured to automatically display the icon on the second region of the virtual keypad without selecting the displayed POI name.

2. The apparatus of claim 1, further comprising:
an input unit configured to adjust according to POI information for providing an assisted POI search function.

3. The apparatus of claim 2, wherein when a POI search is conducted using the input unit, the input unit includes a plurality of keys that become non-selectable according to the POI information.

4. The apparatus of claim 2, wherein when a POI search is conducted using the input unit, the display unit further displays the roadside information associated with the searched POI obtained due to the POI search.

5. The apparatus of claim 1, wherein the controller searches the one POI according to a user request.

6. The apparatus of claim 1, wherein the controller is configured to display, on a right roadside of the route, an icon indicating a direction of the searched POI when the searched POI is close to the right roadside of the route, and to display, on a left roadside of the route, the icon indicating a direction of the searched POI when the searched POI is close to the left roadside of the route.

7. The apparatus of claim 6, wherein when the icon indicating a direction of the searched POI is selected, the controller displays information of the searched POI.

8. The apparatus of claim 7, wherein when a key for searching a POI is selected, the controller displays the virtual keypad on the display unit.

9. A navigation method comprising:
displaying, on a display unit, a route from a current location to a destination on map data;
displaying a point of interest (POI) list associated with the route;
when one POI is selected from the displayed POI list, displaying a window inquiring about whether to search only a POI associated with the selected one POI existing by a roadside of the route;
when a first key of the window is selected, searching, from the POI list associated with the route, only the POI associated with the selected one POI;
when a second key of the window is selected, searching, from the POI list associated with the route, the POI associated with the selected one POI and POIs near the route;
displaying roadside information associated with each of the searched POI, the roadside information indicates whether a location of the searched POI is close to a left roadside of the route or a right roadside of the route, and is displayed on a left or the right side of a roadside icon,
wherein the searched POI indicates a point where the route is not changed;
displaying a virtual keypad having a plurality of keys on the display unit;
receiving a POI name through the displayed virtual keypad;
displaying the received POI name on a first region of the virtual keypad;
searching the received POI name from the POI list;
displaying, on a second region of the virtual keypad, an icon indicating whether a location of the searched POI name is close to the left roadside of the route or the right roadside of the route while the searched POI name is displayed on the first region of the virtual keypad; and
automatically displaying the icon on the second region of the virtual keypad without selecting the displayed POI name.

10. The method of claim 9, further comprising:
adjusting an input unit according to a POI information for providing an assisted POI search function.

11. The method of claim 10, wherein when a POI search is conducted using the input unit, the input unit includes a plurality of keys that become non-selectable according to the POI information.

12. The method of claim 10, further comprising displaying the roadside information for the searched POI obtained due to a POI search when the POI search is conducted using the input unit.

13. The method of claim 9, further comprising searching the at least one POI according to a user request.

14. The method of claim 9, wherein when the searched POI is close to the right roadside of the route, an icon indicating a direction of the searched POI is displayed on the right roadside of the route and when the searched POI is located at the left roadside of the route, the icon indicating a direction of the searched POI is displayed on the left roadside of the route.

15. The method of claim 14, further comprising:
when the icon indicating a direction is selected, displaying information of the searched POI corresponding to the icon indicating a direction on the map data.

16. The method of claim 9, further comprising:
when a key for searching a POI is selected, displaying the virtual keypad on the display unit.

17. A navigation apparatus comprising:
a display unit configured to display, on map data, a route from a current location to a destination; and
a controller configured to:
display a point of interest (POI) list associated with the route;
when one POI is selected from the displayed POI list, display a window inquiring about whether to search only a POI associated with the selected one POI existing by a roadside of the route;
when a first key of the window is selected, search, from the POI list associated with the route, only the POI associated with the selected one POI;
when a second key of the window is selected, search, from the POI list associated with the route, the POI associated with the selected one POI and POIs near the route; and
cooperate with the display unit to display turn-by-turn and roadside information of the searched POI along the roadside of the route, the roadside information indicates whether a location of the searched POI is close to a left roadside of the route or a right roadside of the route, and is displayed on a left or a right side of a roadside, wherein the searched POI indicates a point where the route is not changed, wherein the controller is further configured to:

display a virtual keypad having a plurality of keys on the display unit;

receive a POI name through the displayed virtual keypad;

display the received POI name on a first region of the virtual keypad;

search the received POI name from the POI list; and display, on a second region of the virtual keypad, an icon indicating whether a location of the searched POI name is close to the left roadside of the route or the right roadside of the route while the searched POI name is displayed on the first region of the virtual keypad, and wherein the controller is configured to automatically display the icon on the second region of the virtual keypad without selecting the displayed POI name.

18. A navigation method comprising:

displaying, on a display unit, a route from a current location to a destination on map data;

displaying a point of interest (POI) list associated with the route;

when one POI is selected from the displayed POI list, displaying a window inquiring about whether to search only a POI associated with the selected one POI existing by a roadside of the route;

when a first key of the window is selected, searching, from the POI list associated with the route, only the POI associated with the selected one POI;

when a second key of the window is selected, searching, from the POI list associated with the route, the POI associated with the selected one POI and POIs near the route;

displaying turn-by-turn and roadside information of the searched POI associated with the roadside of the route, the roadside information indicates whether a location of the searched POI is close to a left roadside of the route or a right roadside of the route, and is displayed on a left or a right side of a roadside icon without displaying the location of the searched POI, wherein the searched POI indicates a point where the route is not changed;

displaying a virtual keypad having a plurality of keys on the display unit;

receiving a POI name through the displayed virtual keypad;

displaying the received POI name on a first region of the virtual keypad;

displaying, on a second region of the virtual keypad, an icon indicating whether a location of the POI name inputted by the user is close to the left roadside of the route or the right roadside of the route while the searched POI name is displayed on the first region of the virtual keypad; and automatically displaying the icon on the second region of the virtual keypad without selecting the displayed POI name.

* * * * *